Nov. 15, 1932.  R. J. BUSH  1,887,578

FLUID PRESSURE REGULATING VALVE DEVICE

Filed Aug. 13, 1930

INVENTOR
RANKIN J. BUSH
BY Wm. M. Cady
ATTORNEY

Patented Nov. 15, 1932

1,887,578

UNITED STATES PATENT OFFICE

RANKIN J. BUSH, OF JEANNETTE, PENNSYLVANIA, ASSIGNOR TO THE WESTINGHOUSE AIR BRAKE COMPANY, OF WILMERDING, PENNSYLVANIA, A CORPORATION OF PENNSYLVANIA

FLUID PRESSURE REGULATING VALVE DEVICE

Application filed August 13, 1930. Serial No. 475,021.

This invention relates to fluid pressure regulators or pressure reducing valve devices adapted to be located between a source of fluid supply and a pipe or chamber, wherein it is desired to maintain the fluid at a substantially constant degree of pressure which is less than that of the source of supply.

An object of the invention is to provide an improved fluid pressure regulating valve device of the above type having a chamber and means in the chamber for controlling the pressure of the fluid supplied to the chamber from a source of supply and means for venting the fluid from the chamber to the atmosphere when the pressure of the fluid increases above a predetermined amount.

Another object of the invention is to provide an improved fluid pressure regulating valve device of the character mentioned which is simple in construction, and reliable and exact in function under all conditions of service.

The invention also comprises certain new and useful improvements in the construction, arrangement, and combination of the several parts of which it is composed, as will be hereinafter more fully described and claimed.

Figure 1:
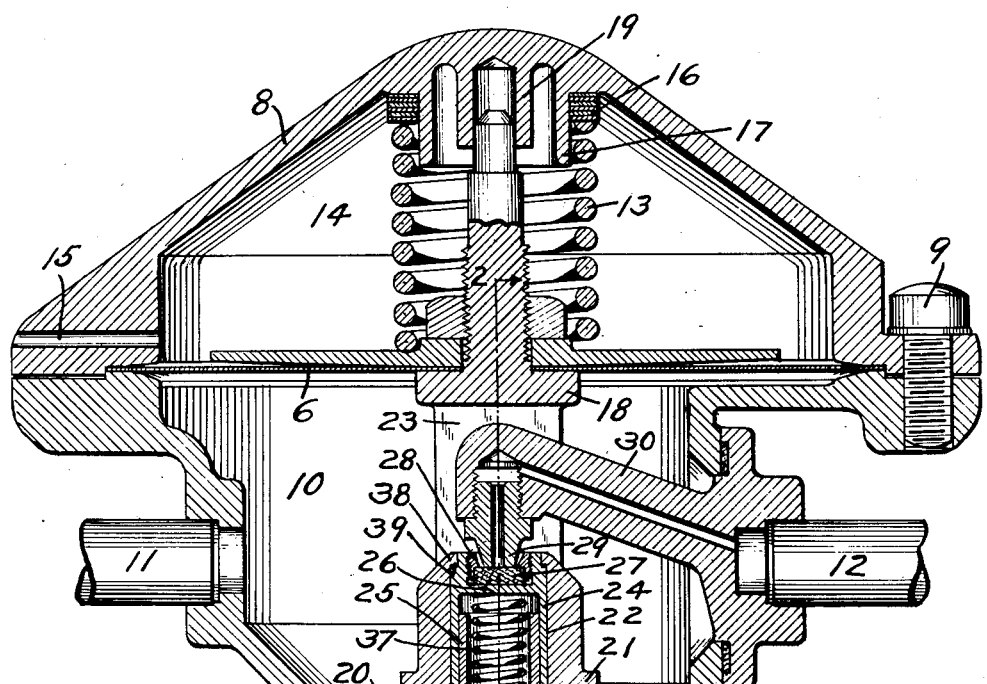
Figure 2:
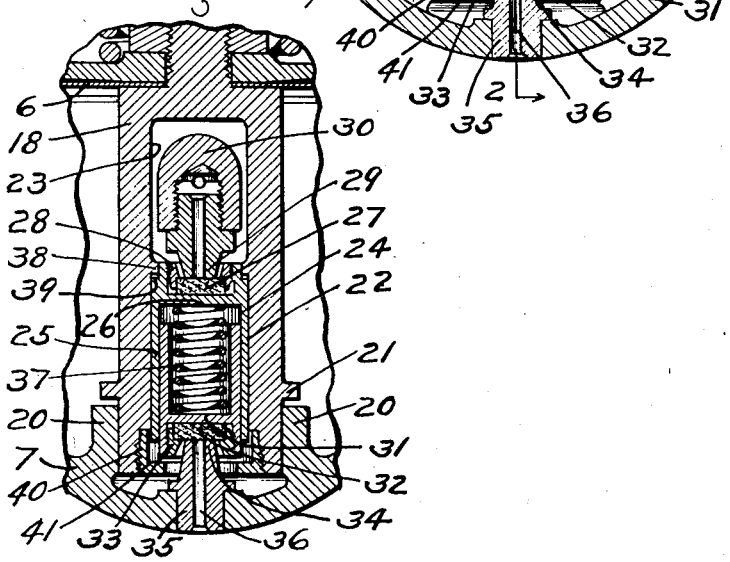

In the accompanying drawing: Figure 1 is a vertical longitudinal section of a fluid pressure regulating valve device embodying the invention; and Fig. 2 is a section taken on the line 2—2 of Fig. 1.

Referring to the drawing, the device may comprise a diaphragm 6, which is clamped between two casing sections 7 and 8, secured together by screws 9. The sections 7 and 8 of the casing are each dome-shaped so as to provide chambers on each side of the diaphragm.

On one side, the diaphragm 6 is subject to the pressure of fluid in chamber 10, which is open at all times to an outlet pipe 11. Fluid is supplied to chamber 10 through a pipe 12, and the supply of fluid is controlled by valve means to be hereinafter more fully described.

The side of the diaphragm 6 opposite to the chamber 10 is subject to the pressure of a spring 13 mounted in chamber 14. Chamber 14 is open to the atmosphere through an opening 15 formed in the wall of the section 8 of the casing. The tension of the spring 13 is adjusted by means of a plurality of washers 16, which are inserted between the upper end of the spring and the adjacent portion of the wall of the casing when the parts are being assembled. In order to prevent dislodgement of the washers 16, as well as the upper end of the spring 13, the section 8 of the casing is formed with a tubular boss 17 which projects downwardly into the chamber 14, and which has an exterior diameter of a size to snugly receive the washers 16.

The diaphragm 6 carries a valve stem 18 which projects upwardly into the chamber 14 and downwardly into the chamber 10.

The lower part of the valve stem 18 is adapted to carry the valve means for controlling the supply of fluid to the chamber 10. The upper end of the valve stem is disposed in a recessed boss 19 projecting inwardly from the top of the section 8 of the casing. The boss 19 is within the boss 17 heretofore described, and provides means for guiding the valve stem 18.

The lower portion of the valve stem 18 is made somewhat larger than the upper portion, and the extremity of the lower portion of the valve stem is disposed between lugs 20 which project upwardly from the bottom of the section 7 of the casing.

At a suitable distance above its bottom, the lower portion of the valve stem 18 is provided with an annular flange 21. Normally the flange 21 is spaced from the top of the lugs 20, but when the diaphragm 6 is deflected downwardly by the pressure of spring 13, in the manner to be hereinafter more fully described, the flange 21 engages the top of the lugs 20 and thereby prevents any further downward movement of the valve stem 18.

The lower portion of the valve stem 18 is formed with a vertical opening or bore 22, which extends upwardly from the bottom of the valve stem. Intersecting the bore 22 is a slot 23, which is formed transversely through the valve stem.

Mounted within the bore 22 of the valve stem is an inlet valve device 24 and a release valve device 25.

The inlet valve device 24 comprises a cylindrical body, which is open at the lower end so as to receive the release valve device 25. Near its top, the valve device 24 is provided with a transverse web 26, upon which is mounted a valve seat 27. The valve seat 27 is retained in place by means of a ring 28 threaded in the upper open end of the valve device 24. The valve seat 27 is adapted to engage a seat rib 29 which is mounted on the inner end of a tubular arm 30 formed as an extension of the pipe 12, so as to cut off the supply of fluid to the chamber 10.

The release valve device 25 comprises a cylindrical body which is telescopingly mounted in the inlet valve device 24. The body of the valve device 25 is open at its upper end, and near its bottom, the valve device 25 is provided with a transverse web 31, upon which is mounted a valve seat 32. The valve seat 32 is retained in place by means of a ring 33 threaded in the lower open end of the valve device 25. The valve seat 32 is adapted to engage a seat rib 34 formed on a nipple 35 mounted in the bottom of the section 7 of the casing, so as to cut off communication through an opening 36 in the nipple to the atmosphere.

For the purpose of normally maintaining the valve devices 24 and 25 extended relatively to each other, an expansible coil spring 37 is provided. One end of the spring bears against the web 26 of the valve device 24 and the other end of said spring bears against the web 31 of the valve device 25.

The upper portion of the bore 22 of the valve stem 18 is provided with an inwardly projecting flange 38, and the upper portion of the inlet valve device 24 is formed with a shoulder 39, against which the flange 38 is adapted to engage during the operation of the device for the purpose to be hereinafter more fully described.

The lower portion of the bore 22 is provided with a sleeve 40 having an inwardly extending flange 41 which projects beneath the bottom of the valve device 25.

In operation, when chamber 10 is initially uncharged, the pressure of spring 13 maintains the diaphragm 6 in its lower position in which the flange 38 of the valve stem 18 engages shoulder 39 on the inlet valve device 24 and holds said valve device unseated from the seat rib 29 and the release valve device 25 seated on the seat rib 34, so that the atmospheric exhaust port 36 is closed.

With the inlet valve device 24 unseated, fluid under pressure is permitted to flow into the chamber 10 from the pipe 12. When the pressure of the fluid thus supplied to chamber 10 becomes sufficient to overbalance the opposing pressure of spring 13 on the diaphragm 6, said diaphragm is deflected upwardly, which permits spring 37 to seat the inlet valve device 24 and cut off the supply of fluid.

If for any reason chamber 10 becomes charged with fluid under pressure to a degree higher than that permitted by the spring 13, the diaphragm 6 is deflected upwardly. This action moves the flange 41 of the sleeve 40 on the lower end of the valve stem 18 upwardly into engagement with the release valve device 25 and the release valve device is unseated, so that the excess fluid under pressure in chamber 10 is vented to the atmosphere through opening 36.

A valve device of this character is particularly applicable for installation with any equipment in which it is desired to supply fluid to a chamber at a substantially uniform predetermined pressure, and an important feature of the invention is the provision of the means for venting fluid from the chamber 10 to the atmosphere when the pressure in the chamber exceeds the predetermined amount. Accordingly, the pipe 11 is adapted to lead to a receptacle (not shown) which is to be supplied with fluid at a predetermined pressure from the valve chamber 10.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A fluid pressure regulator comprising a chamber having a flexible diaphragm therein, an inlet passage and an outlet connected to said chamber, said inlet passage being provided with a valve seat, a vent port leading from the chamber to the atmosphere and having a valve seat spaced from and facing said inlet valve seat, both of said valve seats being disposed along the longitudinal center line of said chamber, a stem carried by the diaphragm and enclosing the inlet valve seat, and a pair of oppositely disposed valves mounted in a bore of said stem, one valve being movable in one direction by said stem away from one valve seat, and the other valve being movable by said stem in the opposite direction away from the other valve seat.

2. A fluid pressure regulator comprising a chamber having a flexible diaphragm therein capable of being deflected by fluid pressure, an inlet passage and an outlet connected to said chamber, said inlet passage being provided with a valve seat which is disposed along the longitudinal center line of the chamber, a vent port leading from the chamber to the atmosphere, the inner end of said vent port being provided with a valve seat which is spaced from and disposed in alinement with said inlet valve seat, a stem extending from said diaphragm into said chamber, said stem being provided with a longitudinal bore therein, a pair of telescoping valves mounted in the bore of said stem, one of said valves being adapted to engage said inlet valve seat and the other valve being adapted to engage said vent port valve seat, and a spring interposed between said valves for urging the valves toward their respective seats.

In testimony whereof I have hereunto set my hand, this 11th day of August, 1930.
RANKIN J. BUSH.